(12) United States Patent
Porter

(10) Patent No.: US 8,720,156 B2
(45) Date of Patent: May 13, 2014

(54) WALL PANEL ATTACHMENT SYSTEM

(76) Inventor: Charles Porter, Blythewood, SC (US)

( * ) Notice: Subject to any disclaimer, the term of this patent is extended or adjusted under 35 U.S.C. 154(b) by 0 days.

(21) Appl. No.: 13/616,095

(22) Filed: Sep. 14, 2012

(65) Prior Publication Data
US 2014/0075882 A1    Mar. 20, 2014

(51) Int. Cl.
*E04B 1/38*    (2006.01)
(52) U.S. Cl.
USPC ........... 52/711; 52/127.9; 52/127.12; 52/706; 52/512; 411/349
(58) Field of Classification Search
CPC ............... E04B 2/04; E04B 2/06; E04B 2/08; E04B 1/40; E04B 2002/0202; E04B 2002/0243; E04B 2002/0245
USPC .............. 52/127.9, 127.11, 127.12, 701, 702, 52/704, 703, 706, 709, 711, 365, 506.05, 52/512, 511; 411/347, 349; 248/222.52, 248/222.51, 906
See application file for complete search history.

(56) References Cited

U.S. PATENT DOCUMENTS

| | | | |
|---|---|---|---|
| 1,272,696 A | | 7/1918 | Mock |
| 1,294,584 A | | 3/1919 | Mock |
| 1,729,879 A | * | 10/1929 | Krantz et al. ............. 292/256.75 |
| 2,320,400 A | * | 6/1943 | Bedell ............................ 220/3.6 |
| 2,697,857 A | * | 12/1954 | Eckel ........................... 52/506.05 |
| 3,018,080 A | * | 1/1962 | James ........................... 248/228.4 |
| 3,216,584 A | | 6/1963 | Sedo |
| 3,228,644 A | | 1/1966 | Sand |
| 3,261,578 A | | 7/1966 | Himebaugh |
| 3,385,156 A | * | 5/1968 | Polos ............................... 411/30 |
| 3,955,790 A | | 5/1976 | Ballin |
| 4,333,575 A | | 6/1982 | Wong |
| 4,337,915 A | | 7/1982 | Cali |
| 4,458,873 A | | 7/1984 | Sutherland |
| 4,460,147 A | * | 7/1984 | Macbain ....................... 248/542 |
| 4,509,713 A | | 4/1985 | Hogg |
| 4,572,708 A | | 2/1986 | Fischer |
| 4,632,285 A | | 12/1986 | Dillingham |
| 4,669,169 A | | 6/1987 | Hogg |
| 4,724,281 A | | 2/1988 | Nix et al. |
| 4,804,161 A | | 2/1989 | Wallo |
| 4,828,439 A | * | 5/1989 | Giannuzzi ....................... 411/37 |
| 4,871,140 A | | 10/1989 | Hoskinson et al. |
| 4,903,851 A | | 2/1990 | Slough |
| 4,903,934 A | * | 2/1990 | Fremstad ...................... 248/551 |
| 5,032,856 A | * | 7/1991 | McMinn ....................... 396/427 |
| 5,069,412 A | | 12/1991 | Jacob |
| 5,236,344 A | | 8/1993 | Baron |
| 5,328,139 A | | 7/1994 | Barnes |
| 5,467,571 A | * | 11/1995 | Khatibi ....................... 52/718.04 |
| 5,488,808 A | * | 2/1996 | Cahill et al. ................. 52/584.1 |
| 5,509,560 A | | 4/1996 | Nash |

(Continued)

*Primary Examiner* — Brent W Herring
(74) *Attorney, Agent, or Firm* — McNair Law Firm, P.A.; Seann P. Lahey

(57) ABSTRACT

A panel hanger for flush mounting a wall panel to drywall. The panel hanger includes a cylindrical mounting body adapted for being inserted into a drywall sheet. A control member is rotatably carried by the mounting body. A clamp arm is rotatably carried by the control member. Rotation of the control member draws the clamp arm toward the mounting body and rotates the clamp arm to extend beyond a diameter of the mounting body for engaging the drywall sheet to secure the mounting body to the drywall. A hanger slot is disposed within the mounting body for receiving a hanger member carrying a drywall sheet.

17 Claims, 9 Drawing Sheets

(56) References Cited

U.S. PATENT DOCUMENTS

| | | | |
|---|---|---|---|
| 5,588,629 A | 12/1996 | Barnes | |
| 5,749,558 A | 5/1998 | Wallo | |
| 5,931,432 A * | 8/1999 | Herold et al. | 248/343 |
| 5,953,865 A * | 9/1999 | Rickards | 52/139 |
| 6,042,078 A | 3/2000 | Donovan | |
| 6,095,478 A | 8/2000 | Barnes | |
| 6,102,360 A * | 8/2000 | Clegg et al. | 248/27.1 |
| 6,170,685 B1 * | 1/2001 | Currier | 220/3.3 |
| 6,186,466 B1 | 2/2001 | Baird et al. | |
| 6,240,182 B1 * | 5/2001 | Gillett et al. | 379/435 |
| 6,241,368 B1 * | 6/2001 | Depino | 362/364 |
| 6,250,865 B1 * | 6/2001 | McSherry | 411/344 |
| 6,346,674 B1 * | 2/2002 | Gretz | 174/58 |
| 6,758,455 B2 | 7/2004 | Weck et al. | |
| 6,769,660 B2 | 8/2004 | DeLine | |
| 6,880,795 B1 | 4/2005 | Haynes | |
| 7,077,610 B2 * | 7/2006 | Diaz | 411/344 |
| 7,150,596 B2 * | 12/2006 | Diaz et al. | 411/344 |
| 7,198,244 B2 | 4/2007 | Deline | |
| 7,300,025 B2 * | 11/2007 | Korcz | 248/56 |
| 7,316,078 B2 | 1/2008 | Hagman | |
| D572,122 S | 7/2008 | Cave | |
| 7,427,053 B2 | 9/2008 | Nawrocki | |
| 7,468,487 B1 * | 12/2008 | Murphy | 174/58 |
| 7,594,636 B2 | 9/2009 | Wong | |
| 7,600,956 B2 * | 10/2009 | McDuff et al. | 411/80.1 |
| 7,628,366 B2 * | 12/2009 | Scott | 248/343 |
| 7,677,521 B2 * | 3/2010 | Price | 248/475.1 |
| 7,682,116 B2 * | 3/2010 | Cabrele et al. | 411/80.5 |
| 7,759,576 B1 * | 7/2010 | Gretz | 174/58 |
| 7,877,948 B2 * | 2/2011 | Davies | 52/506.05 |
| 8,044,300 B1 * | 10/2011 | Gretz | 174/58 |
| 8,076,575 B1 * | 12/2011 | Gretz | 174/50 |
| 8,142,122 B2 * | 3/2012 | McDuff et al. | 411/32 |
| 8,148,634 B1 * | 4/2012 | Gretz | 174/50 |
| 8,148,635 B1 * | 4/2012 | Gretz | 174/50 |
| 8,282,318 B2 * | 10/2012 | Robertson, Jr. | 405/259.4 |
| 8,287,217 B2 * | 10/2012 | Pisoni | 411/60.1 |
| 8,303,225 B2 * | 11/2012 | Kearl et al. | 411/344 |
| 8,317,444 B1 * | 11/2012 | Hensley | 411/107 |
| 8,439,613 B1 * | 5/2013 | Prentice | 411/21 |
| 8,445,779 B1 * | 5/2013 | Gretz | 174/53 |
| 8,449,236 B2 * | 5/2013 | McDuff et al. | 411/344 |
| 2002/0033437 A1 | 3/2002 | Lemire | |
| 2002/0187017 A1 * | 12/2002 | Rogers et al. | 411/349 |
| 2005/0051564 A1 | 3/2005 | Pimpinella | |
| 2006/0113264 A1 | 6/2006 | Ferber et al. | |
| 2007/0119109 A1 * | 5/2007 | Kuelker | 52/364 |
| 2008/0072515 A1 * | 3/2008 | Huhnerbein | 52/582.2 |
| 2009/0003962 A1 * | 1/2009 | McDuff et al. | 411/344 |
| 2010/0257796 A1 * | 10/2010 | Bertke et al. | 52/263 |
| 2011/0071683 A1 | 3/2011 | Turton | |
| 2011/0271635 A1 * | 11/2011 | Kearl et al. | 52/705 |
| 2013/0343831 A1 * | 12/2013 | McDuff et al. | 411/340 |

* cited by examiner

WALL PANEL ATTACHMENT SYSTEM

BACKGROUND OF THE INVENTION

1) Field of the Invention

The present invention relates to hardware for hanging items, and more particularly, to a panel hanger for removably installing wall paneling on a drywall sheet with substantially no resulting gap between the drywall sheet and the wall panel carried by the panel hanger.

2) Description of Related Art

Paneling is a popular wall covering because it is attractive and durable. However, it can be problematic to install because it must be properly aligned, the front surface must remain intact, it is heavy, and it is difficult to work with because panels can be large and cumbersome.

Installing paneling can also be problematic because there isn't hardware that facilitates flush hanging on a drywall sheet. For example, conventional wall hangers leave a gap between the panel and wall, which would be both unstable and unattractive. While a gap could be practically eliminated by directly adhering a panel to a wall using an adhesive, this is also undesirable because it does not accommodate panel movement due to expansion and contraction, and can ruin the panels if removal is required.

Accordingly, it is an object of the present invention to provide a panel hanger that is simple, strong, and precise, yet still allows for the movement of panels after installation.

It is a further object of the present invention to provide a panel hanger that is easy and fast to install, inexpensive, and will hold approximately 50 lbs.

It is also a further object of the present invention to provide a panel hanger that is configured to securely hold the wall panel on a drywall sheet in removable manner.

SUMMARY OF THE INVENTION

The above objectives are accomplished according to the present invention by providing a panel hanger for flush mounting a wall panel to drywall comprising a cylindrical mounting body adapted for being inserted into a complementary opening in the drywall; a flat front surface disposed at a first distal end of the mounting body and including a flange extending beyond a diameter of the mounting body, wherein the flange engages an exterior surface of the drywall so that the front surface is disposed generally flush with the exterior surface of the drywall when mounted; a control channel extending through the mounting body along a longitudinal axis from the front surface at the first distal end to a rear surface at an opposite second distal end of the mounting body; a control member rotatably carried in the control channel and extending outward from the rear surface; a clamp arm rotatably carried by the control member adjacent the rear surface, wherein rotation of the control member draws the clamp arm toward the rear surface and rotates the clamp arm from a storage position carried within the diameter of the mounting body to a clamping position extending beyond the diameter of the mounting body so that the clamp arm engages the drywall as the clamp arm is directed toward the rear surface; and, a hanger slot disposed in the front surface for receiving a hanger member carrying the wall panel.

In a further advantageous embodiment, a stop member is carried by the rear surface being operatively associated with the clamp arm to resist further rotation of the clamp arm after rotating to the clamping positions.

In a further advantageous embodiment, a series of ridges extend circumferentially around the mounting body for engaging the drywall when inserted into the complementary opening.

In a further advantageous embodiment, a plurality of stabilizing fins project from the mounting body for engaging the drywall to resist rotation of the mounting body in the complementary opening.

In a further advantageous embodiment, the control member is a screw.

In a further advantageous embodiment, the control channel includes a tapered receiving section extending from the front surface into the mounting body and accommodating a head portion of the control member in a recessed arrangement with the front surface so that the head portion does not extend beyond the front surface to maintain the flush arrangement with the exterior surface of the drywall.

In a further advantageous embodiment, the hanger slot includes a generally U-shaped slot flange disposed within a portion of the hanger slot and defining a narrowed hanger channel receiving and securing the hanger member in the hanger slot.

In a further advantageous embodiment, the slot flange is recessed from the front surface defining a flange recess area in a portion of the hanger slot.

In a further advantageous embodiment, the hanger member includes a head portion laterally spaced from a support collar along a shaft, wherein the hanger member is carried in the narrowed hanger channel with the slot flange disposed between the head portion and the support collar, and the support collar is disposed in the flange recess area so that only the shaft of the hanger member extends beyond the front surface.

In a further advantageous embodiment, the hanger member is laterally movable between side walls of the slot flange when disposed within the narrowed hanger channel to provide play during installation and accommodate panel expansion.

The above objectives are further accomplished according to the present invention by providing a method of flush mounting a wall panel to drywall comprising the steps of cutting an opening into a drywall sheet complementary to a circumference of a panel hanger comprising: a cylindrical mounting body, a control member rotatably carried by the mounting body, a clamp arm rotatably carried by the control member, wherein rotation of the control member draws the clamp arm toward the mounting body and rotates the clamp arm to extend beyond a diameter of the mounting body, and, a hanger slot disposed within the mounting body; inserting the panel hanger into the complementary opening cut into the drywall sheet so that a front surface of the mounting body is flush with an exterior side of the drywall sheet; rotating the control member to direct the clamp arm to extend beyond a diameter of the mounting body and engage the drywall sheet; inserting a marking member into the hanger slot with a marking point extending outward from the hanger slot; aligning the wall panel against the drywall at the desired position for installation; pressing the wall panel against the drywall sheet once aligned in the desired position so that the marking member makes an indent mark on the wall panel; inserting a hanger member into the wall panel at the indent mark so that the remainder of the hanger member projection from the wall panel is fully receivable into the hanger slot; and, inserting the hanger member projecting from the wall panel fully into the hanger slot so that the wall panel is flush mounted to the drywall sheet.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

It will be understood by those skilled in the art that one or more aspects of this invention can meet certain objectives, while one or more other aspects can meet certain other objectives. As such, the preceding objects can be viewed in the alternative with respect to any one aspect of this invention. These and other objects and features of the invention will become more fully apparent when the following detailed description is read in conjunction with the accompanying figures and examples. However, it is to be understood that both the foregoing summary of the invention and the following detailed description are of a preferred embodiments and not restrictive of the invention or other alternate embodiments of the invention. In particular, while the invention is described herein with reference to a number of specific embodiments, it will be appreciated that the description is illustrative of the invention and is not constructed as limiting of the invention. Various modifications and applications may occur to those who are skilled in the art, without departing from the spirit and the scope of the invention.

DETAILED DESCRIPTION OF A PREFERRED EMBODIMENT

Figure 1:
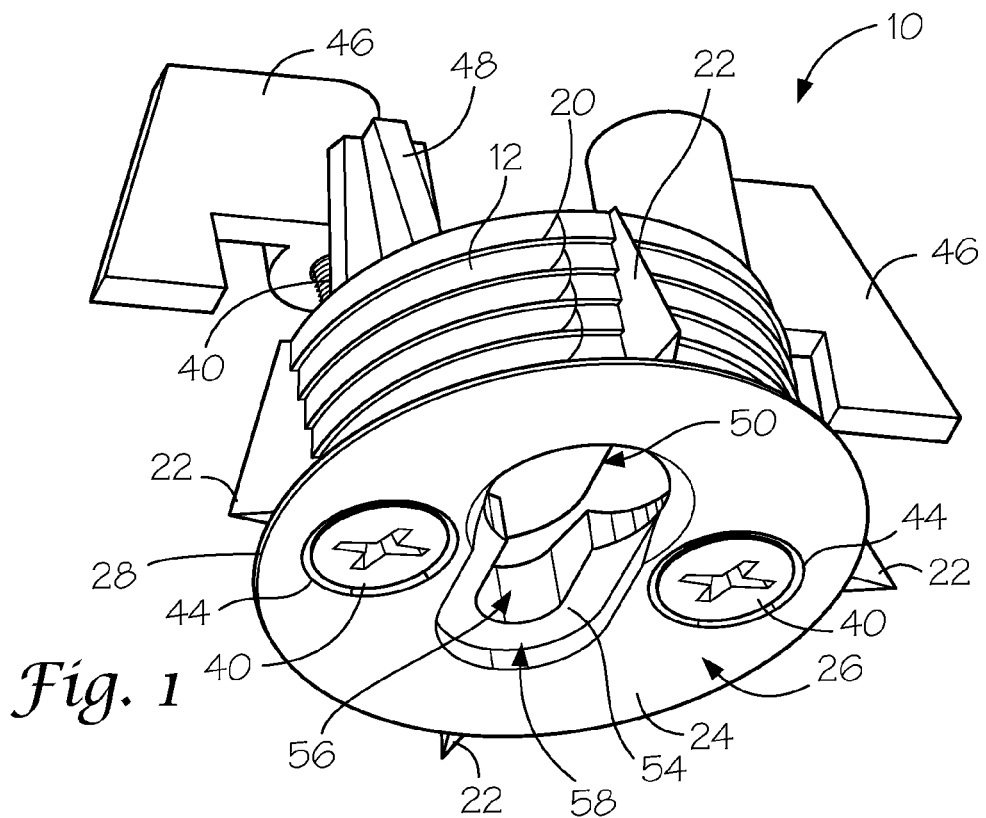
FIG. 1 shows a front perspective view of a panel hanger according to the present invention.
Figure 2:
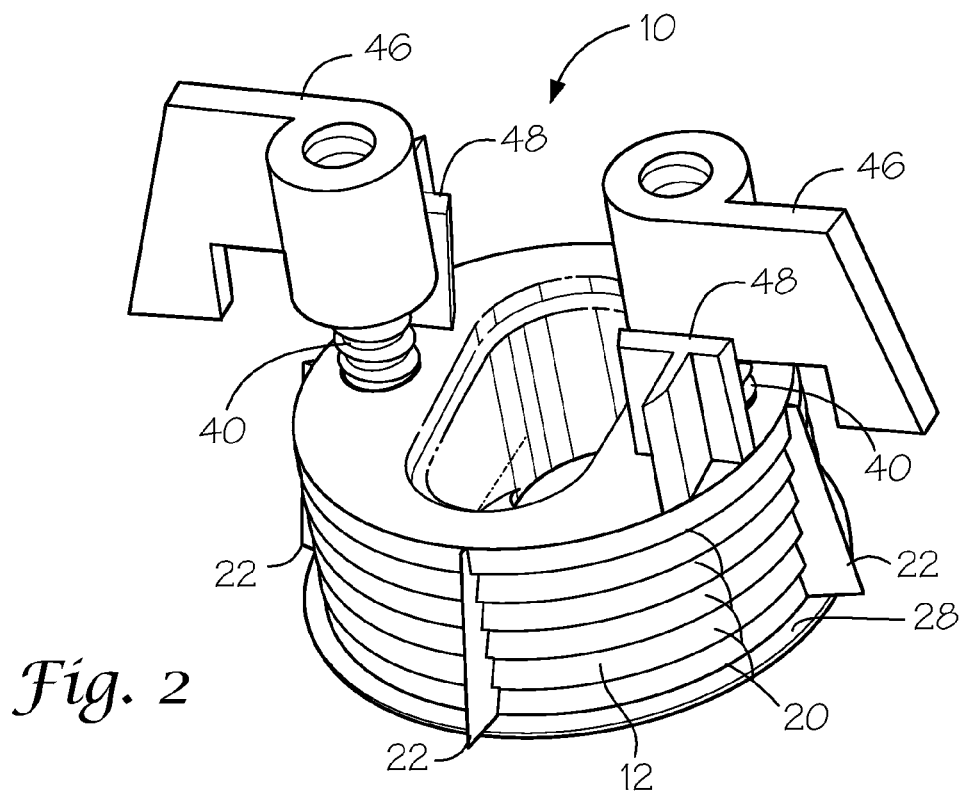
FIG. 2 shows a rear perspective view of the panel hanger according to the present invention.
Figure 3:
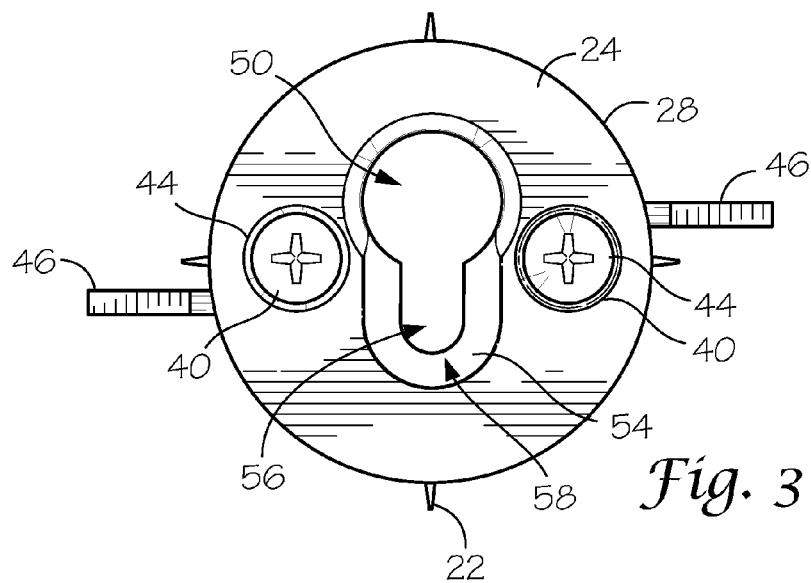
FIG. 3 shows a front elevation view of the panel hanger according to the present invention.

With reference to the drawings, the invention will now be described in more detail. Referring to FIGS. 1 and 2, a panel hanger, designated generally as 10, is shown for flush mounting a wall panel to a sheet of drywall. In the illustrated embodiment, panel hanger 10 includes a cylindrical mounting body 12. Further referring to FIG. 7A, cylindrical mounting body 12 is adapted to be inserted into a complementary cylindrical opening 14 formed in drywall sheet 16 so that cylindrical mounting body 12 engaged an interior portion of drywall sheet 16 in a generally friction fit arrangement. As detailed herein, a wall panel 18 is then mounted to and carried by panel hanger 10 flush with drywall sheet 16 in a secure but removable manner.

Referring to FIGS. 1 and 2, to promote a secure engagement of cylindrical mounting body 12 with the interior portion of drywall sheet 16 defining complementary opening 14, panel hanger 10 includes a series of ridges 20 extending circumferentially around mounting body 12. Ridges 20 engage the interior portion of drywall sheet 16 to resist panel hanger 10 from backing out of complementary opening 14 one inserted therein.

Additionally, panel hanger 10 includes a plurality of stabilizing fins 22 projecting from mounting body 12. Stabilizing fins 22 assist in guiding and aligning mounting body 12 into complementary opening 14 by engaging the interior portion of drywall sheet 16 to resist rotation of mounting body 12 in complementary opening 14.

Figure 4A:
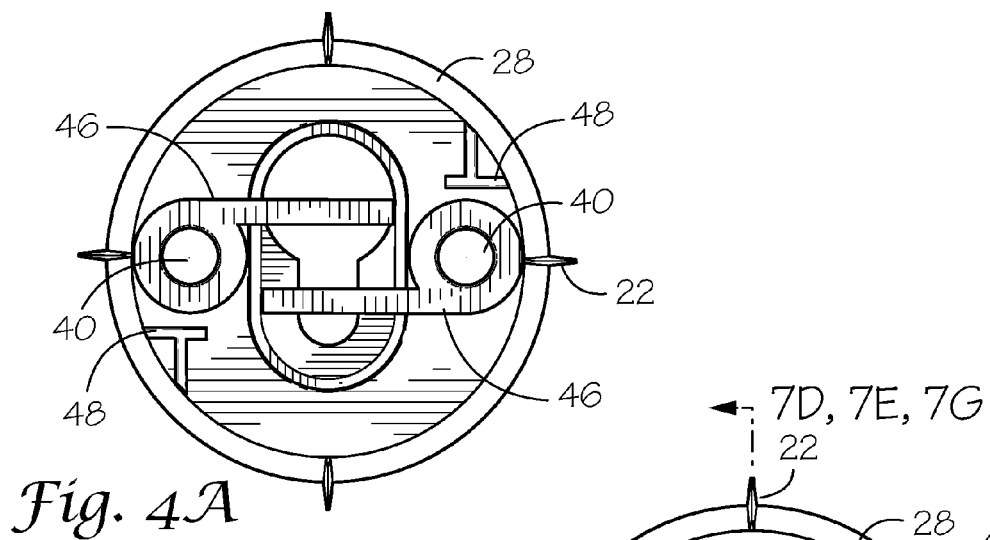
FIG. 4A shows a rear elevation view of the panel hanger with the clamp arms in a storage position according to the present invention.
Figure 4B:
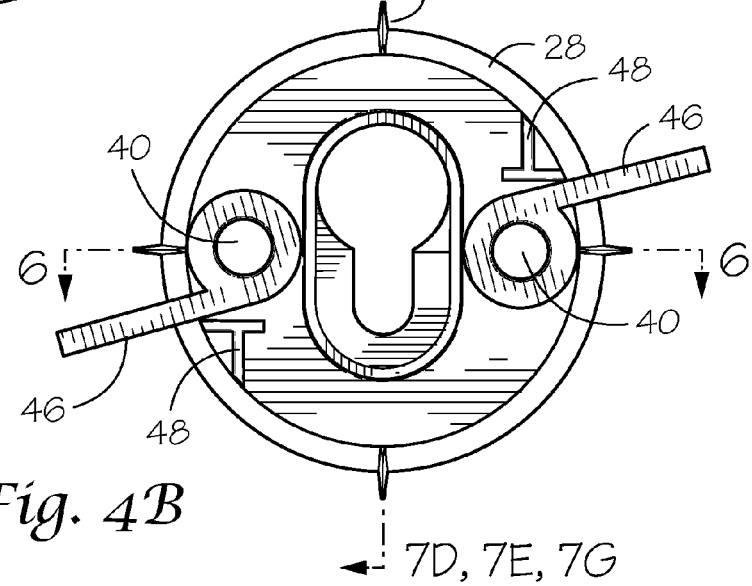
FIG. 4B shows a rear elevation view of the panel hanger with the clamp arms in a clamping position according to the present invention.
Figure 5:
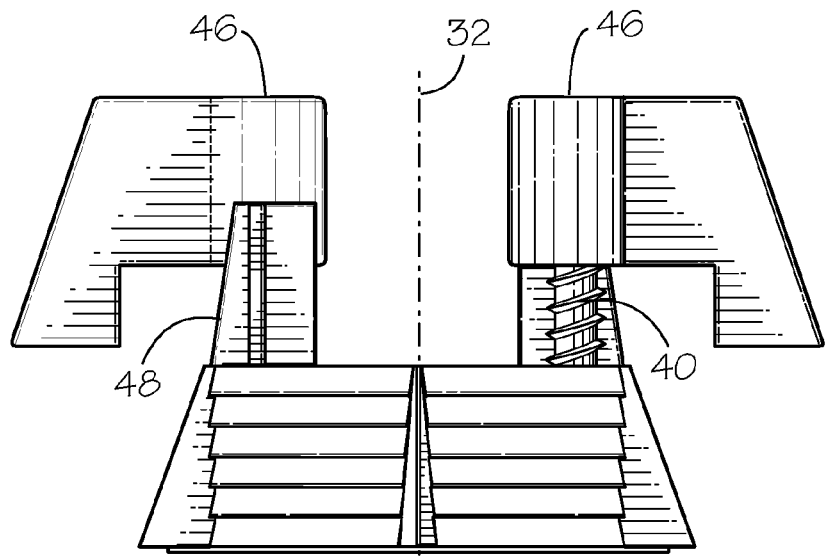
FIG. 5 shows a side view of the panel hanger according to the present invention.

Referring to FIGS. 1 and 2, a flat front surface 24 is disposed at a first distal end 26 of mounting body 12. Front surface 24 further includes a flange 28. Referring to FIGS. 2, 4A and 4B, flange 28 extends beyond a diameter of mounting body 12. Referring to FIG. 7C, accordingly, flange 28 engages an exterior surface 30 of drywall sheet 16 when inserted into complementary opening 14 of drywall sheet 16 so that front surface 24 is disposed generally flush with exterior surface 30 of drywall sheet 16 when mounted.

Figure 6:
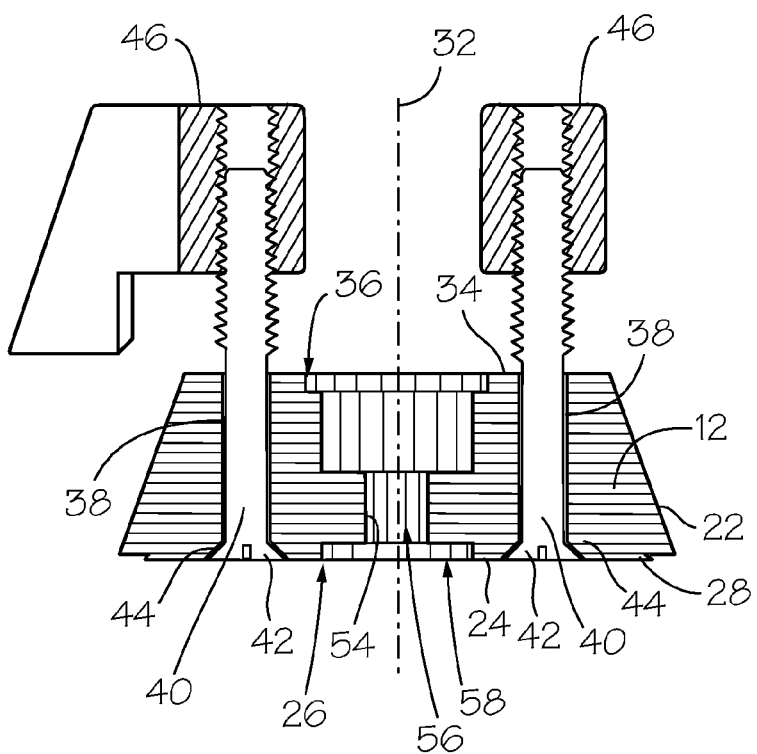
FIG. 6 shows a cross-section view of FIG. 4B.

Referring to FIG. 6, in the illustrated embodiment, a pair of control channels 38 are provided extending through mounting body 12 along a longitudinal axis 32 from front surface 24 at first distal end 26 to a rear surface 34 at an opposite second distal end 36 of mounting body 12.

As best shown in FIG. 6, a control member 40 is rotatably carried in each of control channels 38. In the illustrated embodiment, control member 40 is a screw with a flat screw head portion 42 and extends completely through control channels 38 and outward from rear surface 34. With additional reference to FIG. 1, control channels 38 preferably each include a tapered receiving section 44 extending from front surface 24 into mounting body 12 to accommodating head portion 42 of control members 40. Accordingly, head portions 42 of control members 40 are carried in a recessed arrangement with front surface 24 so that head portion 42 does not extend beyond front surface 24 to maintain the flush arrangement with exterior surface 30 of drywall sheet 16.

Referring to FIGS. 1, 2, 5 and 6, a clamp arm 46 is rotatably carried by each of control members 40 adjacent rear surface 34. Referring to FIGS. 3, 4A, 4B, 7B and 7C, rotation of control members 40 draws the respective clamp arm 46 toward rear surface 34, as well as rotates each clamp arm 46 from a storage position (FIGS. 4A and 7B) wherein each clamp arm 46 is carried within the diameter of mounting body 12 to a clamping position (FIGS. 3, 4B and 7C) extending beyond the diameter of mounting body 12. Thus, once positioned in complementary opening 14 of drywall sheet 16, clamp arms 46 swing out and engage the opposite exterior surface 31 of drywall sheet 16 from flange 28 as the clamp arms are directed toward rear surface 34. Accordingly, flange 28 and clamp arms 46 cooperate to secure mounting body 12 into drywall sheet 16, while stabilizer fins 22 prevent any unwanted rotation to maintain proper alignment.

Referring to FIGS. 4A and 4B, a pair of stop members 48 are carried by rear surface 34, each one being operatively associated with a respective clamp arm 46. As clamp arms 46 rotate out to the clamping position, they abut one of stop members 48 to resist further rotation. However, each of clamp arms 46 can still be drawn toward rear surface 34 when abutting one of stop members 48 to continue to tighten against drywall sheet 16.

Figure 7A:
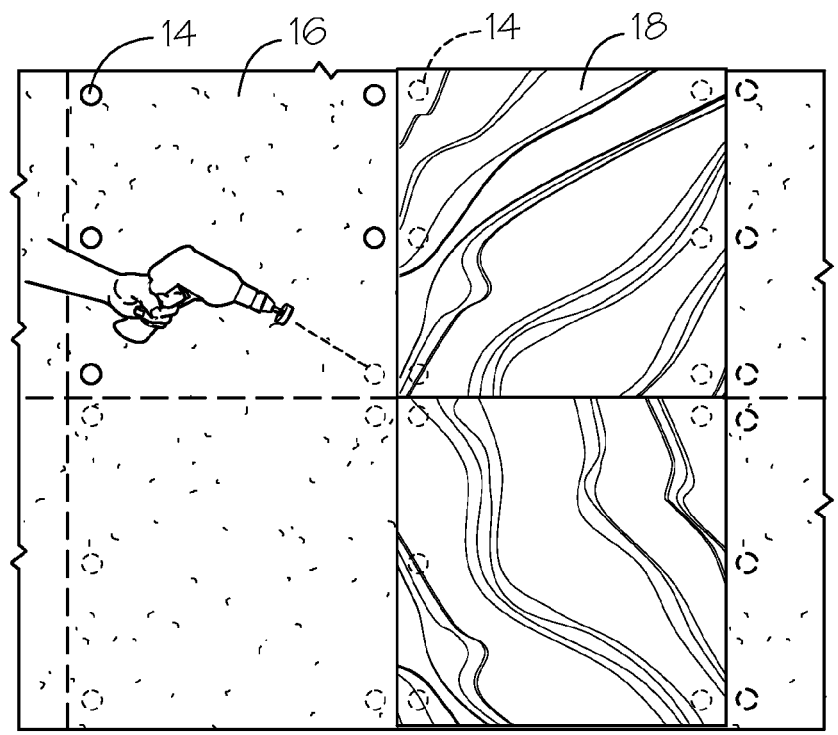
FIG. 7A shows a drywall sheet with openings for receiving the panel hanger according to the present invention.
Figure 7B:
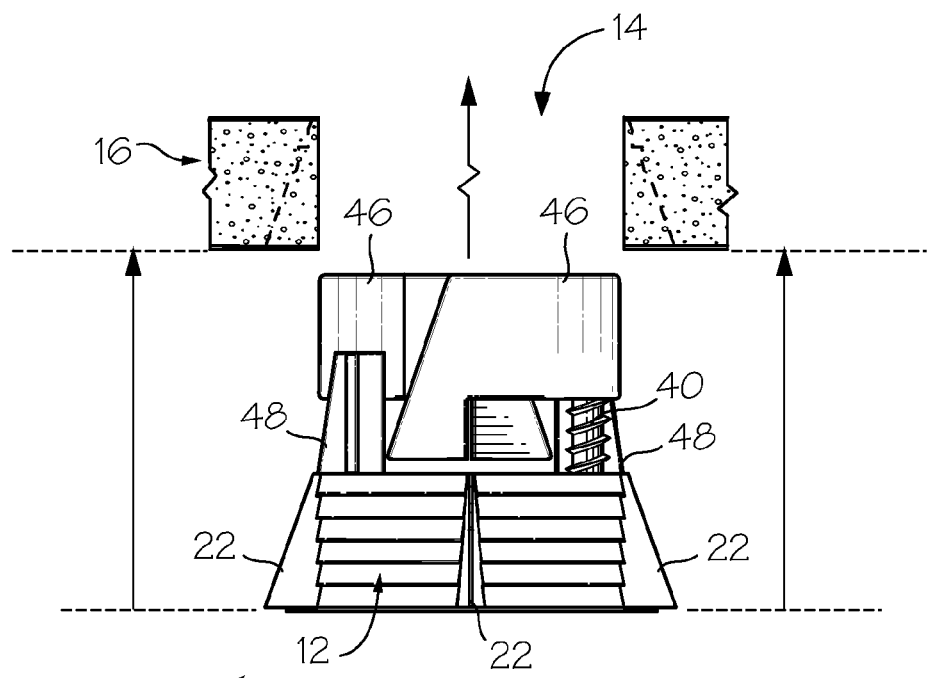
FIG. 7B shows installation of the panel hanger into the drywall sheet according to the present invention.
Figure 7C:
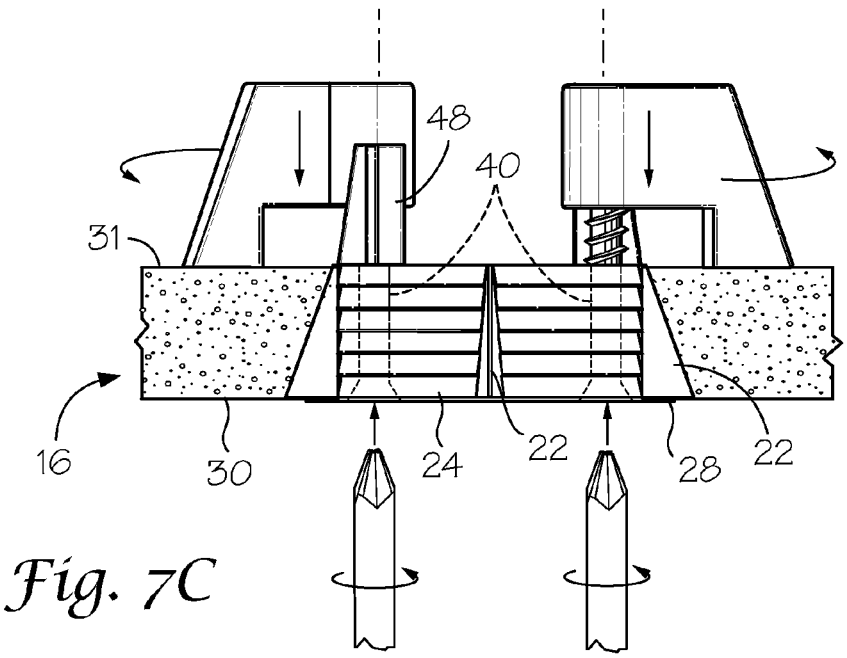
FIG. 7C shows clamping of the panel hanger to the drywall sheet according to the present invention.
Figures 7D, 7E:
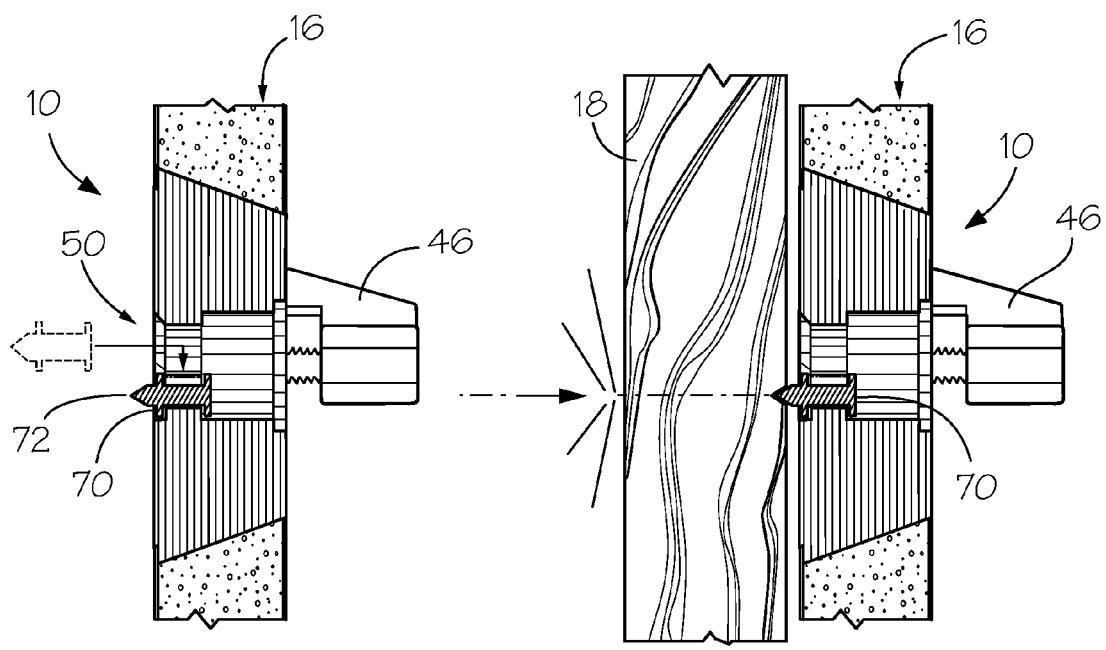
FIGS. 7D-7E show a marking member carried in the panel hanger and pressing of the wall panel against the marking member according to the present invention.
Figure 7F:
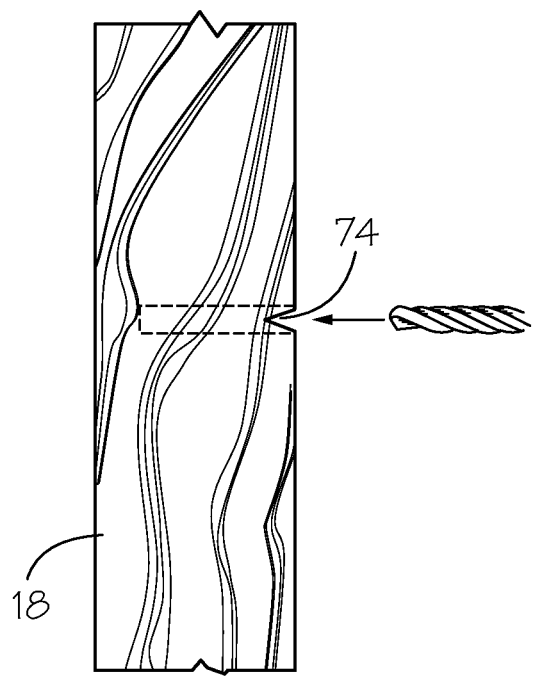
FIGS. 7F-7G show installation of a hanger member in the wall panel insertion of the hanger member into the panel hanger for mounting the wall panel according to the present invention.
Figure 7G:
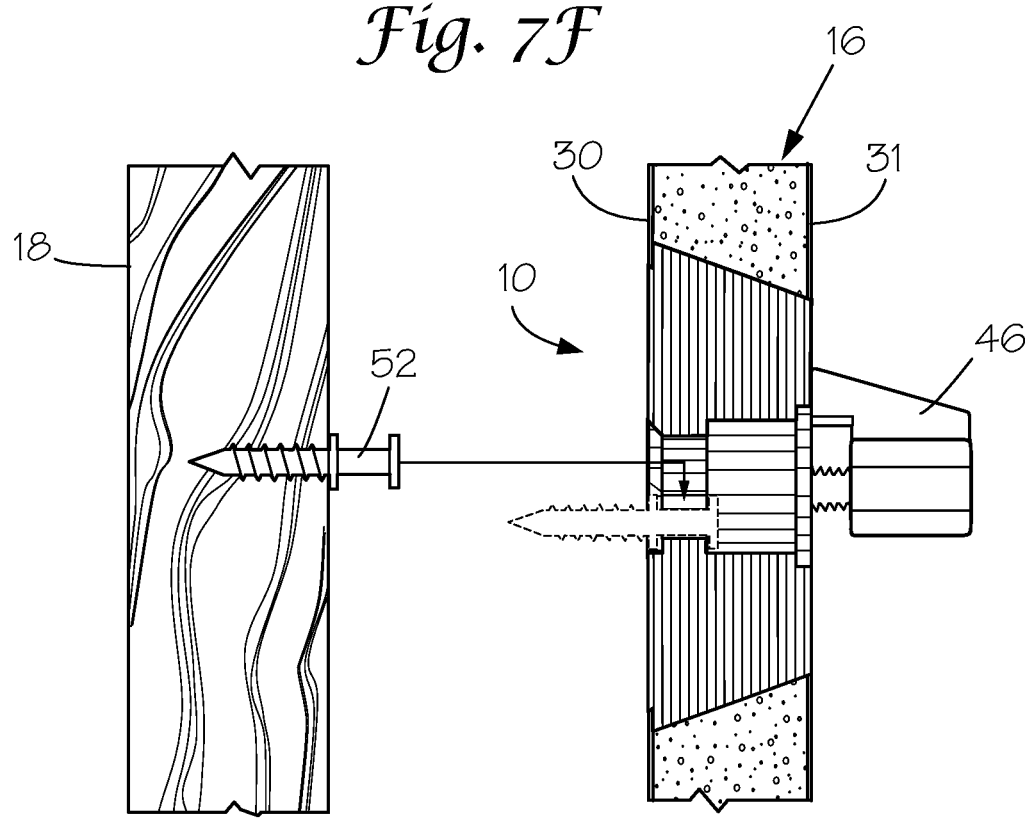

Referring to FIGS. 1, 8A-8C, and 9B a hanger slot, designated generally as 50, is disposed in front surface 24 for receiving a hanger member 52 (FIGS. 7G and 9B) carrying wall panel 18 (FIG. 7G). Hanger slot 50 includes a generally U-shaped slot flange 54 disposed within a portion of hanger slot 50 and defines a narrowed hanger channel 56 receiving and securing hanger member 52 in hanger slot 50. Further, slot flange 54 is recessed from front surface 24 defining a flange recess area, designated generally as 58, in a portion of hanger slot 50, which received a portion of hanger member 52. In the illustrated embodiment, hanger member 52 includes a head portion 60 laterally spaced from a support collar 62 along a shaft 64. Hanger member 52 is carried in narrowed hanger channel 56 with slot flange 54 disposed between head portion 60 and support collar 62 to hold hanger member 52 in hanger slot 50. Additionally, support collar 62 is disposed in flange recess area 58 so that only shaft 64 of hanger member 52 extends beyond front surface 24.

Figure 8A:
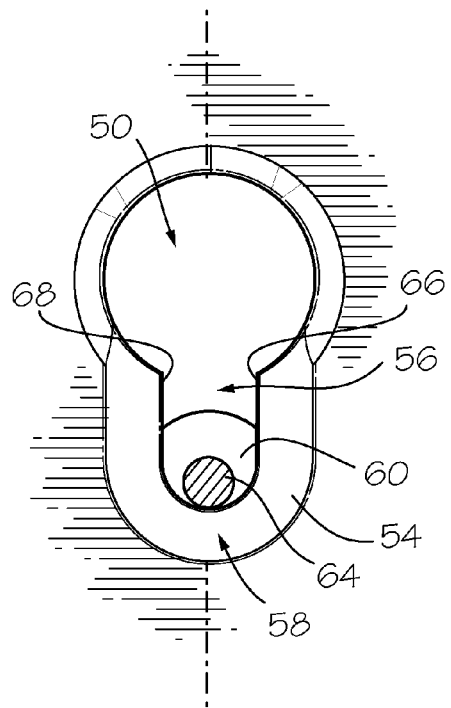
FIGS. 8A-8C show the hanger member carried in the panel hanger according to the present invention.
Figure 8B:
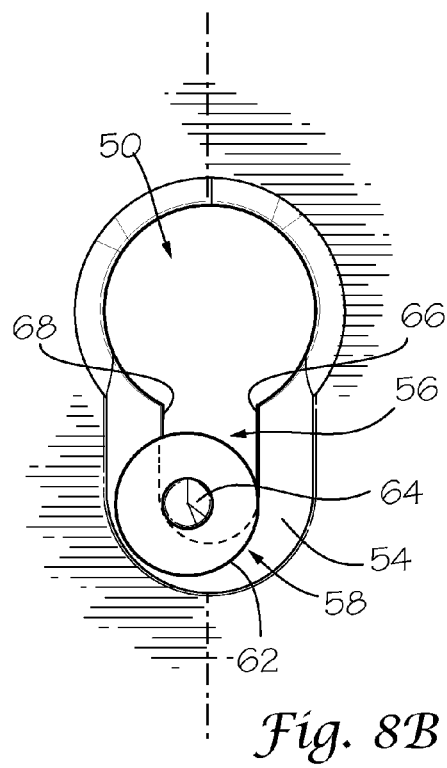
Figure 8C:
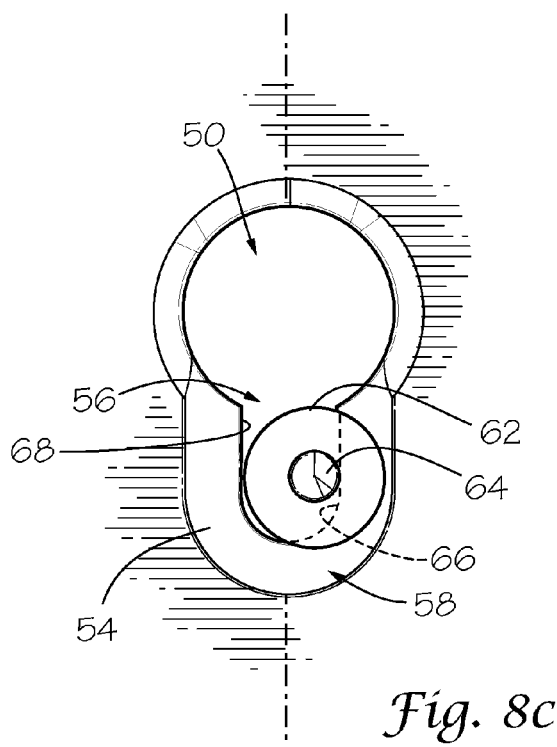

Referring to FIGS. 8A-8C, hanger member 52 is laterally movable between side walls 66, 68 of slot flange 54 when disposed within narrowed hanger channel 56 to provide play during installation and accommodate panel expansion. Accordingly, flange recess area 58 is constructed and arranged to accommodate the intended shifting movement of hanger member 52 so that support collar 62 also has sufficient room to move with shaft 64.

Figure 10:
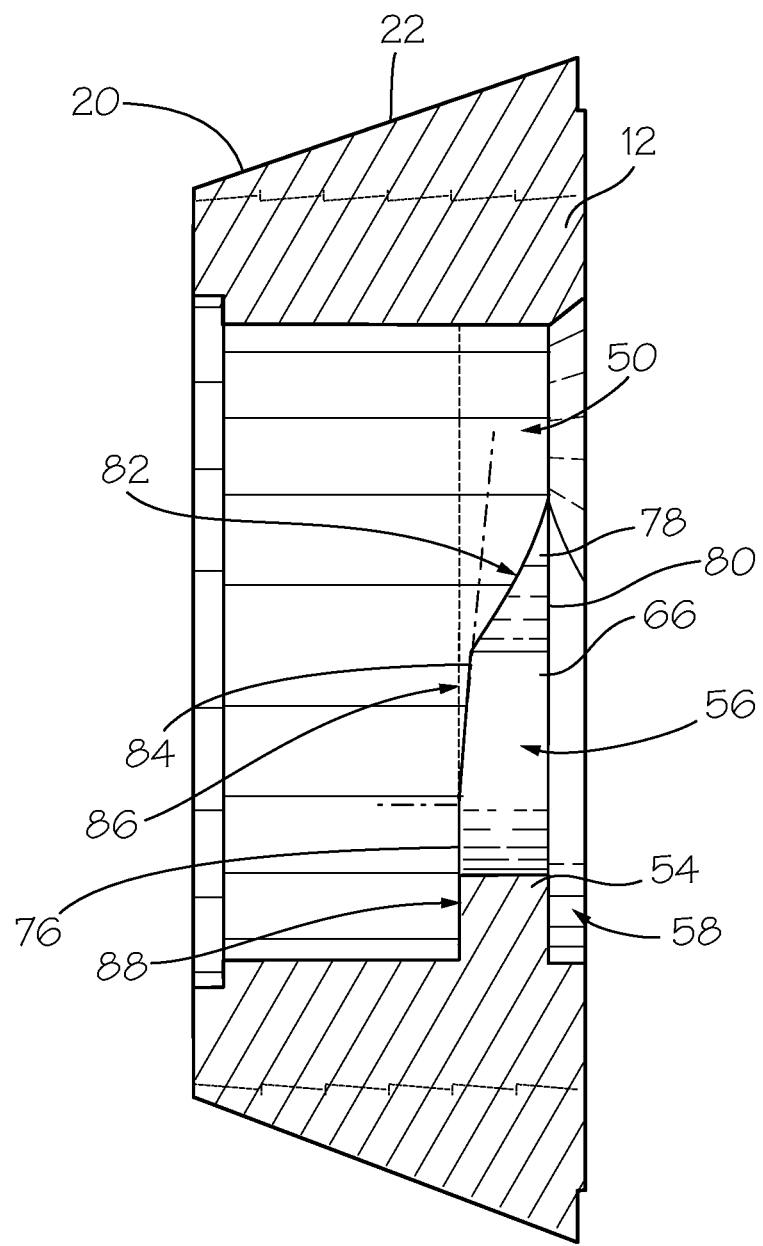

Referring to FIG. 10, a rear wall 76 of slot flange 54 is adapted to facilitate entry of hanger member 52 into narrowed hanger channel 56 and to direct wall panel 18 against drywall sheet 16. In the illustrated embodiment, rear wall 76 includes an angled receiving face 78 disposed at an upper portion 82 of slot flange 54 extending from a front wall 80 of slot flange 54 to rear wall 76. Angled receiving face 78 then transitions directly into a slanted rear wall portion 84 along a mid portion 86 of rear wall 76. In a preferred embodiment, slanted rear wall portion 84 is angled at a slant of approximately 5°. Slanted rear wall portion 84 then transitions into a bottom wall portion 88 extending parallel to front wall 80 and defining the remainder of slot flange 54. In use, as hanger member 52 is inserted into hanger slot 50, angled receiving face 78 helps receive and directed hanger member 52 smoothly into narrowed hanger channel 56. Upon entering narrowed hanger channel 56, hanger member 52 is then directed inwardly by slanted rear wall portion 84 to help directed wall panel 18 carried by hanger member 52 against drywall sheet 16. Finally, the parallel surfaces of front wall 80 and rear wall 76 defining bottom wall portion 88 help hold hanger member 52 in position within narrow hanger channel 56 by engaging head portion 60 and support collar 62.

Figure 9A:
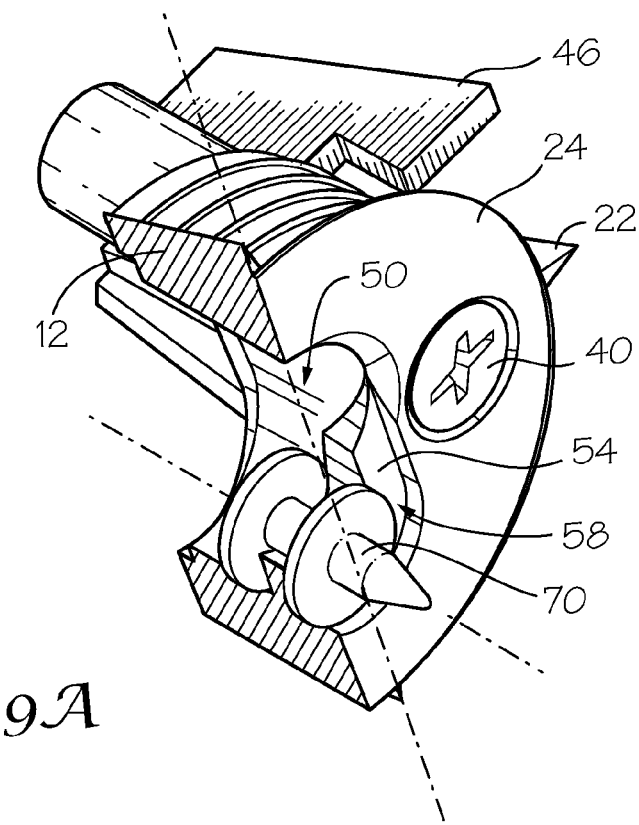
FIG. 9A shows a cross-section view of the panel hanger carrying the marking member according to the present invention.
Figure 9B:
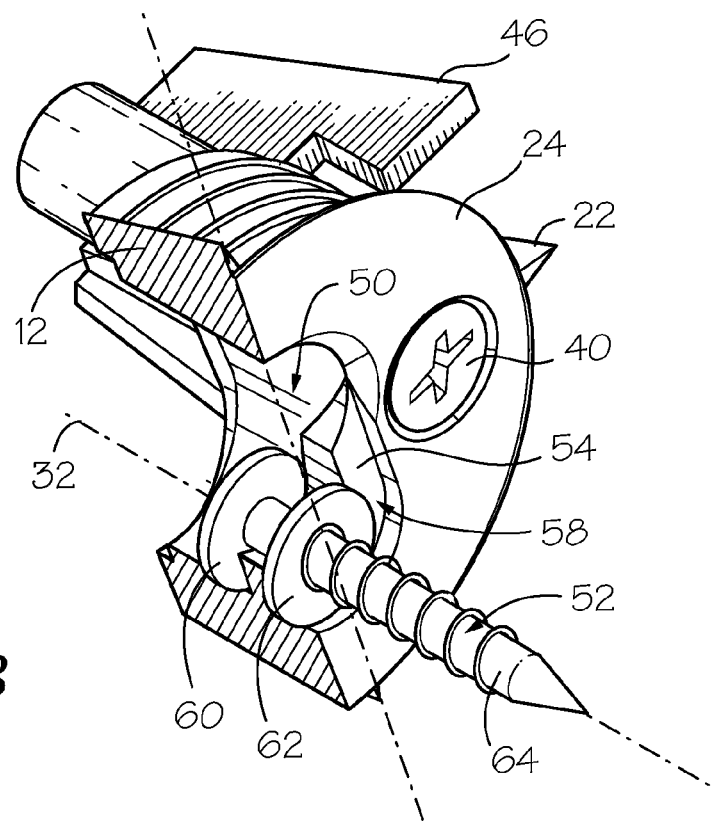
FIG. 9B shows a cross-section view of the panel hanger carrying the hanger member according to the present invention; and, FIG. 10 shows a cross-section view detailing elements of the slot flange according to the present invention.

Referring to FIGS. 7A-7G, a method of flush mounting a wall panel to a sheet of drywall is provided. First, as shown in FIG. 7A, an opening 14 must be cut into drywall sheet 16 complementary to a circumference of mounting body 12 of panel hanger 10 so that mounting body 12 is received into opening 14 in a generally friction fit arrangement. Next, as shown in FIG. 7B, panel hanger 10 is inserted into complementary opening 14 cut into drywall sheet 16 so that front surface 24 and flange 28 of mounting body 12 are flush with exterior side 30 of drywall sheet 16. Next, as shown in FIG. 7C, control members 40 are rotated to direct clamp arms 46 to extend from a storage position (FIG. 7B) to a clamping position extending beyond a diameter of mounting body 12 and drawn toward rear surface 34 to engage opposing exterior surface 31 of drywall sheet 16. Next, as shown in FIG. 7D and with reference to FIG. 9A, a marking member 70 is inserted into narrow hanger channel 56 of hanger slot 50 with a marking point 72 extending outward beyond front surface 24. Next, as shown in FIGS. 7E and 7F, wall panel 18 is aligned against drywall 16 at a desired position for installation. Wall panel 18 is then pressed against drywall sheet 16 once aligned in the desired position so that marking member 70 makes an indent mark 74 on wall panel 18. In the illustrated embodiment, a hole is drilled at the indent mark 74 to receive a hanger member 52. Certain screw types may not necessitate the drilling of a hole to received the hanger member. Next, as shown in FIG. 7G, hanger member 52 is inserted into wall panel 18 at the indent mark 74 so that a remainder of hanger member 52 projection from wall panel 18 is fully receivable into hanger slot 50. Finally, hanger member 52 projecting from wall panel 18 is fully inserted into hanger slot 50 and secured in narrow hanger channel 56 so that wall panel 18 is flush mounted to drywall sheet 16.

While a preferred embodiment of the invention has been described using specific terms, such description is for illustrative purposes only, and it is to be understood that changes and variations may be made without departing from the spirit or scope of the following claims.

What is claimed is:

1. A panel hanger for flush mounting a wall panel to drywall, said panel hanger comprising:
    a cylindrical mounting body adapted for being inserted into a complementary opening in the drywall;
    a flat front surface disposed at a first distal end of said mounting body and including a flange extending beyond a diameter of said mounting body, wherein said flange engages an exterior surface of the drywall so that said front surface is disposed generally flush with said exterior surface of the drywall when mounted;
    a control channel extending through said mounting body along a longitudinal axis from said front surface at said first distal end to a rear surface at an opposite second distal end of said mounting body;
    a control member rotatably carried in said control channel and extending outward from said rear surface;
    a clamp arm rotatably carried by said control member adjacent said rear surface, wherein rotation of said control member draws said clamp arm toward said rear surface and rotates said clamp arm from a storage position carried within the diameter of said mounting body to a clamping position extending beyond the diameter of said mounting body so that said clamp arm engages said drywall as said clamp arm is directed toward said rear surface;
    a hanger slot disposed in said front surface for receiving a hanger member carrying the wall panel; and,
    a generally U-shaped slot flange disposed within a portion of said hanger slot and defining a narrowed hanger channel receiving and securing said hanger member in said hanger slot.

2. The panel hanger of claim 1 including a stop member carried by said rear surface being operatively associated with said clamp arm to resist further rotation of said clamp arm after rotating to said clamping positions.

3. The panel hanger of claim 1 including a series of ridges extending circumferentially around said mounting body for engaging the drywall when inserted into said complementary opening.

4. The panel hanger of claim 1 including a plurality of stabilizing fins projecting from said mounting body for engaging the drywall to resist rotation of said mounting body in said complementary opening.

5. The panel hanger of claim 1 wherein said control member is a screw.

6. The panel hanger of claim 1 wherein said control channel includes a tapered receiving section extending from said front surface into said mounting body and accommodating a head portion of said control member in a recessed arrangement with said front surface so that said head portion does not extend beyond said front surface to maintain said flush arrangement with said exterior surface of the drywall.

7. The panel hanger of claim 1 wherein said slot flange is recessed from said front surface defining a flange recess area in a portion of said hanger slot.

8. The panel hanger of claim 7 wherein said hanger member includes a head portion laterally spaced from a support collar along a shaft, wherein said hanger member is carried in said narrowed hanger channel with said slot flange disposed between said head portion and said support collar, and said support collar is disposed in said flange recess area so that only said shaft of said hanger member extends beyond said front surface.

9. The panel hanger of claim 8 wherein said hanger member is laterally movable between side walls of said slot flange when disposed within said narrowed hanger channel to provide play during installation and accommodate panel expansion.

10. A panel hanger for flush mounting a wall panel to drywall, said panel hanger comprising:
a cylindrical mounting body;
a control member rotatably carried by said mounting body;
a clamp arm rotatably carried by said control member, wherein rotation of said control member draws said clamp arm toward said mounting body and rotates said clamp arm to extend beyond a diameter of said mounting body;
a hanger slot disposed within said mounting body; and,
a slot flange disposed within a portion of said hanger slot defining a narrowed hanger channel receiving and securing a hanger member in said hanger slot.

11. The panel hanger of claim 10 including a series of ridges extending circumferentially around said mounting body for engaging the drywall.

12. The panel hanger of claim 10 including a plurality of stabilizing fins projecting from said mounting body to resist rotation of said mounting body in the drywall.

13. The panel hanger of claim 10 wherein said control channel includes a tapered receiving section accommodating a head portion of said control member in a completely recessed arrangement within said mounting body.

14. The panel hanger of claim 10 wherein said slot flange is generally U-shaped.

15. The panel hanger of claim 14 wherein said hanger member is laterally movable between side walls of said slot flange when disposed within said narrowed hanger channel to provide play during installation and accommodate panel expansion.

16. The panel hanger of claim 10 wherein said slot flange is recessed to define a flange recess area in a portion of said hanger slot.

17. The panel hanger of claim 10 including a stop member carried by said mounting body being operatively associated with said clamp arm to resist rotation of said clamp arm beyond a defined point.

* * * * *